United States Patent [19]

Sink et al.

[11] 4,114,743
[45] Sep. 19, 1978

[54] FLUID ACTUATED OPERATOR AND CLUTCH LINKAGE

[75] Inventors: William H. Sink, Auburn; Russel L. Mitchener, Pleasant Lake, both of Ind.

[73] Assignee: Dana Corporation, Toledo, Ohio

[21] Appl. No.: 682,364

[22] Filed: May 3, 1976

[51] Int. Cl.$^2$ ............................................. F16D 25/00
[52] U.S. Cl. .................................. 192/91 R; 91/376 R
[58] Field of Search ........................... 91/376, 378, 428; 192/91 R; 92/98 R, 98 D, 100; 137/625.68

[56] References Cited

U.S. PATENT DOCUMENTS

| | | | |
|---|---|---|---|
| 1,273,534 | 7/1918 | Pierce | 92/100 |
| 1,548,232 | 8/1925 | Westbrook | 192/91 R |
| 1,806,360 | 5/1931 | Moller | 92/100 |
| 2,071,204 | 2/1937 | Hunt | 137/625.68 |
| 2,383,082 | 8/1945 | Rossmann | 91/376 X |
| 3,003,608 | 10/1961 | Biraben | 192/91 R |
| 3,012,751 | 12/1961 | Hauser | 92/100 X |
| 3,019,770 | 2/1962 | Balass | 91/376 |
| 3,053,052 | 9/1962 | Garrison et al. | 91/378 X |
| 3,060,899 | 10/1962 | May et al. | 91/376 |
| 3,072,150 | 1/1963 | Hastings et al. | 92/98 R |
| 3,367,244 | 2/1968 | Charter | 92/98 R |
| 3,596,564 | 8/1971 | Johnson | 192/91 R |

FOREIGN PATENT DOCUMENTS 487,909  6/1938  United Kingdom ...................... 91/378

*Primary Examiner*—Irwin C. Cohen
*Attorney, Agent, or Firm*—William J. Clemens

[57] ABSTRACT

A fluid actuated operator and linkage for a clutch. The linkage includes an operator link connected between the operator and a throwout bearing actuator arm. The operator includes an operator rod pivotally connected to the operator link and extending through an axial bore of a sleeve internal of the operator housing. The sleeve is connected for movement with the clutch pedal. The sleeve and operator rod form a valve for connecting a source of fluid under pressure to a pressure responsive means in the operator to generate a force to move the rod and disengage the clutch as the clutch pedal is depressed. As the clutch pedal is raised, the valve vents the fluid pressure responsive means to reduce the applied force which allows the clutch pressure springs to return the clutch to engagement. Embodiments are disclosed which have nonlinear characteristics which correspond to the force/displacement operating curves of certain types of clutches.

9 Claims, 5 Drawing Figures

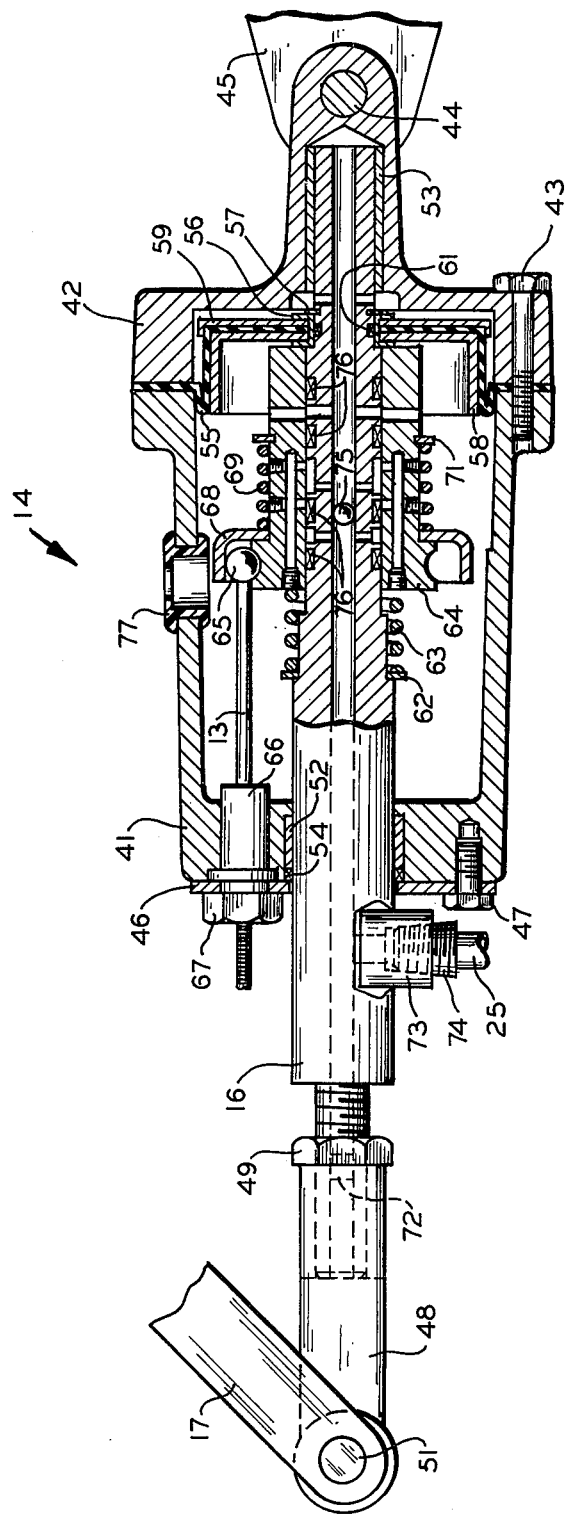
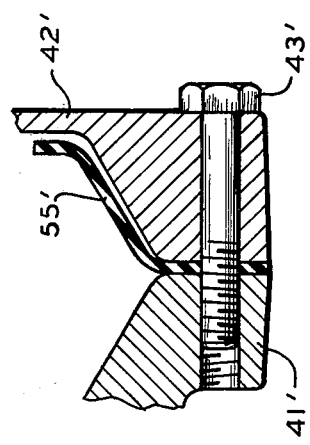
FIG. 2
FIG. 5

FLUID ACTUATED OPERATOR AND CLUTCH LINKAGE

BACKGROUND OF THE INVENTION

1. Field of the Invention

This invention relates to a vehicle clutch control system including a fluid actuated operator and clutch linkage.

2. Description of the Prior Art

Typically, the clutch in an automobile or a light truck is controlled by a clutch pedal connected through a linkage to the clutch throwout bearing. However, when the clutch must transmit relatively high loads such as in heavy duty trucks and construction equipment, the force required to move the clutch pedal is sufficiently high to warrant power assist devices. In addition, for some applications it is desirable to eliminate the rigid linkages typically utilized between the clutch pedal in the vehicle cab and the clutch. For example, in the "cab over" truck the linkage must be flexible or detachable for servicing purposes. Therefore, a fluid actuated operator can be utilized to actuate the clutch with reduced pedal effort in response to control of the driver through the clutch pedal and allow the use of a flexible cable or the like between the cab and the clutch. The fluid utilized in such applications is preferably pressurized air and is so referred to hereinafter although it will be understood that any gas or liquid can also be used.

Normally, clutch operators are connected to a pivoted link to transmit force to the throwout bearing. Most clutches have a bearing load curve that increases from full engagement to full disengagement and are readily controlled. Some clutches, generally known as declining pedal effort clutches, have a lower bearing load at full disengagement than at some point between full engagement and full disengagement. The prior art air actuated clutch operators are not satisfactory in operating such clutches.

The prior art air actuated operators can be of the type which are operated from a source of vacuum, such as the intake manifold of the vehicle engine, or of the type which are operated from a source of air under pressure where a relatively high operator force is required. The operator requires a valve for connecting to and disconnecting from the source when it is desired to actuate the clutch.

A typical prior art operator control valve includes a sleeve valve having a plunger member slidably mounted within a sleeve for movement in response to the operation of the accelerator pedal. The sleeve is provided with a first and second annular series of ports and the plunger has a triangular-shaped body to provide a recess. As the accelerator pedal is released, the plunger is moved so that the recess registers with the two sets of ports to connect the intake manifold to a pressure differential motor which disengages the clutch. As the accelerator pedal is depressed, a spring moves the plunger relative to the sleeve to close the second series of ports which disconnects the intake manifold allowing the clutch to engage. Such a control valve unit is disclosed in U.S. Pat. No. 2,152,088, issued Mar. 28, 1939 to E. R. Price et al.

Another prior art control valve unit includes a sleeve valve having a first outer sleeve, a second inner sleeve slidably mounted within the first sleeve and an operating member slidably mounted within the second sleeve. The operating member is connected to the clutch pedal by a yieldable connection. When the clutch pedal is in the engaged position, the first sleeve disconnects a clutch actuator from the intake manifold. As the clutch pedal is depressed, the operating member and the second sleeve move to close an opening between the first and second sleeves thereby closing off communication between the atmosphere and the actuator. Further depression of the clutch pedal collapses a spring holding the first sleeve in position to register a pair of ports to connect the actuator to the intake manifold. This causes a pressure differential between the ends of the two sleeves resulting in a load upon the clutch pedal directly proportional to the degree of vacuum in the actuator. If the clutch pedal is held in a partially depressed position, the sleeves will be forced in the opposite direction to close the connection between the intake manifold and the actuator to maintain the degree of clutch disengagement achieved. Such a control valve unit is disclosed in U.S. Pat. No. 2,207,827, issued Jan. 14, 1936 to V. W. Kliesrath.

SUMMARY OF THE INVENTION

The present invention relates to an air actuated operator and in certain preferred embodiments provides clutch linkages which are particularly useful in operating declining pedal effort clutches. In accordance with one embodiment, the clutch linkage includes an operator link which is connected between the force applying operator rod and a throwout bearing actuator arm. The pressure springs of the clutch generate a bearing load curve which increases from the fully engaged position to a maximum at an initial engagement position and decreases from the initial engagement position to a fully disengaged position. The operator link is positioned to vary in effective length and thereby produce a decreasing mechanical advantage for the operator as the clutch travels from the fully engaged position to the fully disengaged position. This will cause the clutch to smoothly follow the bearing load force curve to prevent premature engagement or disengagement of the clutch and hunting by the operator.

In another preferred embodiment, a flexible bellows is used in the operator. The bellows operates within a chamber having a tapered or contoured bore. As the bellows moves axially within the chamber in response to the applied air pressure, its effective area varies according to the geometry of the chamber. Suitable chamber designs are provided to achieve the desired operating force/displacement characteristics.

The operator includes a valve for connecting a source of air under pressure to a pressure responsive means in the operator and for venting the pressure responsive means to reduce the air pressure applied thereto. The operator has a housing for enclosing one end of the operator rod and a cooperating sleeve both of which have fluid passages formed therein to define the valve. The source of air under pressure is connected to a fluid passage in the operator rod such that when the valve is opened, the pressurized air is directed into a first cavity in the housing defined by a piston connected to the operator rod. The area between the piston and the housing may be sealed by any suitable means such as a diaphragm or ring seals. The pressurized air generates a force against the piston which tends to move the operator rod which in turn operates the clutch from full engagement to full disengagement. As the valve is closed, the first cavity is vented through the valve to a second cavity on the opposite side of the piston to reduce the operator applied force and allow the clutch to return to the fully engaged position. The second cavity is vented to the atmosphere.

The operator sleeve is connected to the vehicle clutch pedal by a flexible cable for movement between the open and closed positions of the valve. As the clutch pedal is depressed, there is movement of the sleeve relative to the operator rod to compress a biasing spring. The biasing spring is provided to overcome any friction which would prevent the sleeve from returning to the full exhaust position when the cable is relaxed. The sleeve and the operator rod preferrably are provided with a stop means to allow the rod to be directly moved to the clutch disengaging position by the cable and sleeve to provide for manual actuation of the clutch should the source of air fail.

The operator functions as a power assisted servomechanism with the operator rod following the movement of the clutch pedal and sleeve. The sleeve and the operator rod each have at least one radially extending fluid passage at each of three points. As the clutch pedal is depressed, the sleeve will be moved relative to the operator rod to place the first and second fluid passages respectively in registry to connect the source of air under pressure to the first cavity. As the clutch pedal is released, the sleeve will be moved relative to the operator rod to place the second and third fluid passages respectively in registry to connect the first cavity to the second cavity for venting. When the clutch pedal is stationary, whether fully engaged, disengaged or therebetween, the operator rod seeks a corresponding "steady state" position.

It is an object of the present invention to provide a simple, reliable air actuated operator for clutches which is adaptable to a variety of applications.

It is another object of the present invention to provide an air actuated operator and clutch linkage for improving the operation of a declining pedal effort clutch whereby generally smooth operation of the clutch is achieved.

It is a further object of the present invention to provide an air actuated operator and clutch linkage for operating a declining pedal effort clutch wherein the force applied to the operator during movement from the fully disengaged position to the fully engaged position follows an increasing force curve.

It is another object of the present invention to provide an air actuated operator and clutch linkage which may be manually operated if the source of pressurized air fails.

BRIEF DESCRIPTION OF THE DRAWINGS

FIG. 2 which is found on the second sheet of drawings, is an enlarged longitudinal sectional view of the operator and clutch linkage of FIG. 1 in the clutch engaged position;

FIG. 5 is an enlarged fragmentary section view of an alternate embodiment of the present invention.

DESCRIPTION OF THE PREFERRED EMBODIMENT

Figure 1:
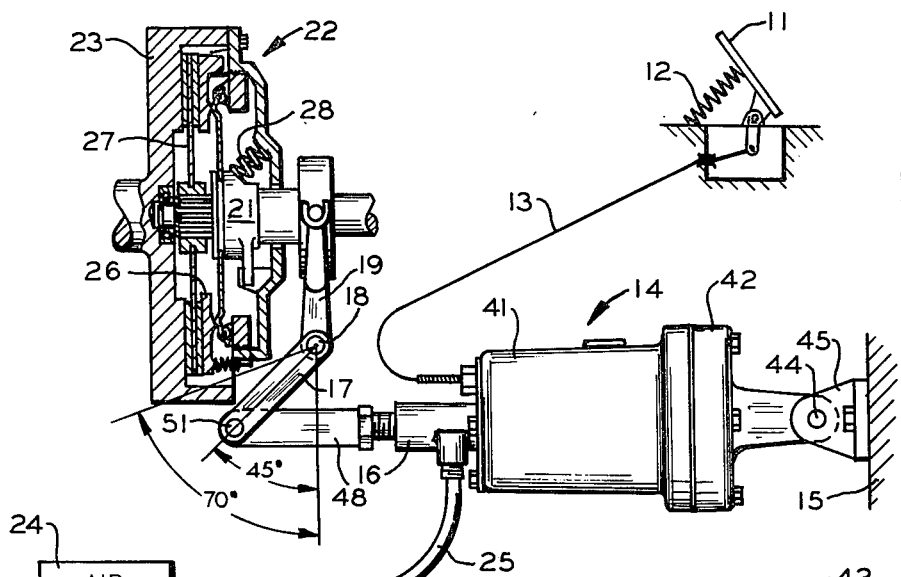
FIG. 1 is a schematic view of vehicle clutch system including an air actuated operator and clutch linkage according to the present invention.

There is shown in FIG. 1 a schematic view of a vehicle clutch system including an air actuated operator and a clutch linkage according to the present invention. Typically, a clutch pedal 11 is pivotally mounted for movement between a free position (shown) and a depressed position. A clutch pedal return spring 12 is connected to the clutch pedal 11 to return it to the free position after it has been depressed and released. A flexible cable 13 is connected between the clutch pedal 11 and an air actuated operator 14. The operator 14 is pivotally connected to a point 15 on the vehicle which is stationary with respect to the vehicle transmission and includes an operator rod 16 pivotally connected to one end of an operator link or lever 17. The other end of the operator link 17 is connected to a cross-shaft 18 pivotally attached to a fixed point on the vehicle such as a transmission case (not shown).

A throwout bearing actuator arm 19 has one end connected to the cross-shaft 18 such that the operator link 17 and the actuator arm 19 simultaneously rotate with the cross-shaft. The other end of the actuator arm 19 is attached to a throwout bearing 21 of the clutch 22. The clutch 22 is attached to a flywheel 23 of the vehicle engine (not shown). A source of air under pressure 24 is connected to an air inlet of the operator rod 16 by a flexible hose 25.

Figure 3:
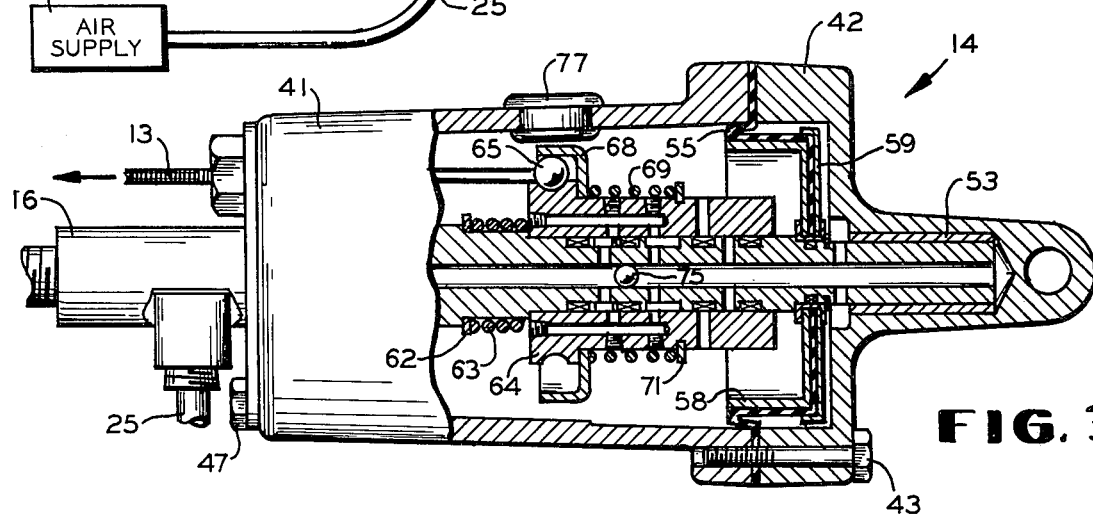
FIG. 3 is an enlarged longitudinal partial section view of the operator of FIG. 1 in the clutch engaged position with initial depression of the clutch pedal.
Figure 4:
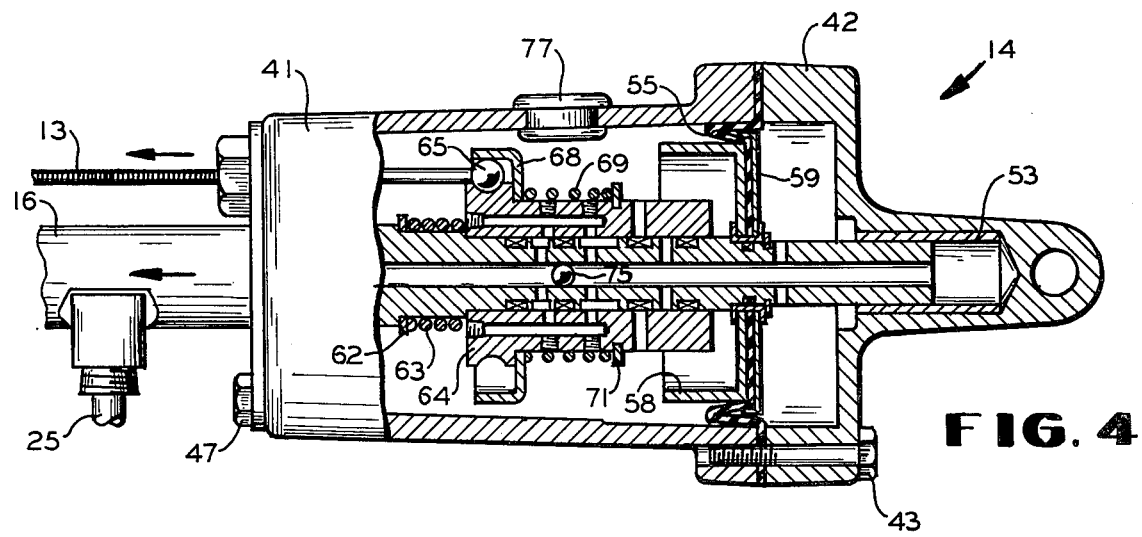
FIG. 4 is an enlarged longitudinal partial section view of the operator of FIG. 1 in the clutch disengaged position.

As the clutch pedal 11 is depressed, that movement is transmitted to the air actuated operator 14 by the flexible cable 13 to open a valve, shown in FIGS. 2 through 4, internal of the operator. The valve applies air from the source of air under pressure 24 to an air pressure responsive means also internal of the operator. The air pressure responsive means then generates a force to extend the operator rod 16 from the operator 14 toward the operator link 17, as shown by the arrow in FIG. 4, to rotate the operator link in a clockwise direction with the cross-shaft 18. As the operator link 17 rotates, the operator 14 will rotate about its pivotal connection at the point 15 to accommodate the operator link movement. The actuator arm 19 rotates with the operator link 17 to move the throwout bearing 21 in a direction away from the flywheel 23 to allow a pressure plate 26 and a driven disk 27 of the clutch 22 to disengage from a driven relationship with the flywheel. The pressure plate 26 is connected in driving relationship with the flywheel 23. Under the influence of the operator 14, the pressure plate 26 compresses the clutch pressure springs, represented by the spring 28, to the fully disengaged position of the clutch 22.

As the clutch pedal 11 is released to return to the free position, the valve in the operator 14 closes a first path through which air is admitted to the air pressure responsive means in response to the movement of the flexible cable 13. The air pressure responsive means is disconnected from the source of air under pressure 24 and a second path is opened in the valve to bleed off the air pressure and reduce the force applied to the operator rod 16. The clutch pressure springs move the pressure plate 26 and the driven disk 27 toward engagement with the flywheel 23. The clutch pressure springs also move the throwout bearing 21 toward the flywheel 23 to rotate the actuator arm 19, the operator link 17 and the cross-shaft 18 in a counter-clockwise direction. The rotation of the operator link 17 forces the operator rod 16 back into the operator 14 toward the position at which the clutch 22 is fully engaged until a positon is reached at which both of the pathes in the valve are closed; i.e., the rod 16 follows the clutch pedal 11.

The operator 14 and the operator link 17 may be utilized to operate any type of vehicle clutch. However, the operator 14 and the operator link 17 according to the present invention have been found to produce clutch operating characteristics superior to the previously known air actuated operators and clutch linkages when utilized to operate a declining pedal effdort clutch. Such a clutch is disclosed in U.S. Pat. No. 3,394,788, issued on July 30, 1968 to William H. Sink, which is assigned to the assignee of the present application and is incorporated by reference herein.

In a conventional clutch, the pressure springs must be capable of exerting a biasing force of a relatively high magnitude to obtain sufficient pressure between the driving and the driven members in the engaged position. Since the pressure springs are typically mounted to provide the biasing force only in a direction parallel to the direction of movement of the throwout bearing, they will generate an increasing throwout bearing load curve as the clutch is operated from the fully engaged to the fully disengaged positions. If an air actuated operator is utilized to operate the clutch, the optimum operating characteristics are obtained when the operator link 17 of FIG. 1 is positioned with its longitudinal axis generally normal to the longitudinal axis of the operator rod 16 when the clutch is in the fully disengaged position and the operator rod is extended from the operator. This relationship will generate the maximum moment about the pivot point 18 and the maximum force for compressing the clutch pressure springs. As the clutch moves toward the fully engaged position, the operator arm 17 is rotated in a counter-clockwise direction to reduce its effective length. When the operator 14 is actuated, the operator link will be rotated in a clockwise direction to increase its effective length and the force applied to the throwout bearing to overcome its increasing load curve.

As shown in FIG. 1, the clutch pressure springs of the clutch disclosed in the previously referenced U.S. Pat. No. 3,394,788, represented by the spring 28, are mounted so that their mounting means move axially toward each other at a constant radial distance from each other. The axial change in the distance for the mounting means results in a shift in the angular relationship of each spring such that the effective spring force component providing the urging force in the direction of movement of the throwout bearing 21 reduces at a lower than normally expected rate between the fully engaged position when new and the fully engaged positon after wear and decreases at a lower than normally expected rate between the fully engaged position and the fully disengaged position. This arrangement provides a clutch having a substantially constant clutch operating pressure over the full range of wear conditions. The load curve increases from the wear position to a maximum beyond the force at which the clutch disengages and decreases toward the fully disengaged position. Therefore, the force required to hold the clutch in the fully disengaged position is less than the maximum force required during movement between full engagement and full disengagement.

When the valve of the air actuated operator closes to disconnect the source of air under pressure, the operator will be vented to reduce the air pressure acting on the air pressure responsive means and thereby reduce the force applied to the throwout bearing. As the operator applied force falls below the reaction force exerted by the compressed clutch pressure springs, the clutch will begin to move from the fully disengaged position to the fully engaged position.

In a conventional clutch and clutch linkage, the throwout bearing load and the operator force both decrease as the clutch moves toward full engagement such that the clutch smoothly follows the bearing load curve for proper operation. However, when a conventional clutch linkage and air actuated operator are utilized with a declining pedal effort clutch, the force/displacement curves of the clutch and the operator and linkage do not complement one another so that optimum operation of the clutch is not achieved. The operator typically has some lost motion between the air on and the exhaust on positions of the valve so that the declining pedal effort clutch may actually continue to move in the desired direction of travel until the lost motion is taken up and the valve is actuated to stop that travel.

The air actuated operator 14 and the operator link 17 of FIG. 1 provide a means for operating the declining pedal effort clutch 22 whereby optimum operation of the clutch is achieved. The operator rod 16 and the operator link 17 are positioned so that the longitudinal axis of the operator link forms an approximately forty-five degree angle with an imaginary line drawn through the center of the cross-shaft 18 normal to the longitudinal axis of the operator rod 16 when the clutch 22 is in the fully engaged position. As the air actuated operator 14 is operated by the depression of the clutch pedal 11 and the movement of the flexible cable 13, the operator arm 16 will be extended from the operator. The operator rod 16 will apply a force to rotate the operator link in a clockwise direction thereby releasing the clutch 22 from engagement. After the operator link 17 has been rotated through an angle of approximately twenty-five degrees, the clutch pressure plate 26 and the driven disk 27 will be in the fully disengaged position. It will be evident that during this rotation the effective length of the operator arm 17 has decreased to reduce the moment about the pivot point, the cross-shaft 18, and decrease the force applied to the clutch pressure springs which is consistent with the declining pedal effort clutch bearing load.

To engage the clutch 22, the clutch pedal 11 is modulated upward toward its free positon to close the valve in the operator 14. The valve disconnects the source of air under pressure 24 and begins venting to reduce the operator applied force. When the operator applied force falls below the bearing load exerted by the compressed clutch pressure springs, the clutch will begin to move from the fully disengaged position toward the fully engaged position. As the clutch pressure springs force the operator link 17 to rotate in a counterclockwise direction, the effective length of the operator link increases and therefore, although the operator force decreases, the applied torque resisting the clutch pressure spring force increases to follow the bearing load curve for proper operation. The operator rod 16 follows the movement of the clutch pedal since the valve in the operator is position sensitive to apply air pressure or vent as required to adjust the movement of the rod.

As shown in FIG. 1, the effective length of the operator link 17 decreases with an increasing angle and increases with a decreasing angle. This effective length is proportional to the cosine of the angle. The moment about the pivot point, the cross-shaft 18, is equal to the effective length times the component of the force applied by the operator 14 in a direction normal to the longitudinal axis of the operator link. This movement is applied by the actuator arm 19 as a force to the throw-out bearing 21.

Referring to FIG. 2, there is shown the air actuated operator 14 of FIG. 1 in an enlarged longitudinal partial section view. The operator 14 includes a front housing 41 and a rear housing 42 connected together by a plurality of suitable fastening means represented by a bolt 43. The rear housing 42 is shown as being pivotally connected to the vehicle frame by a clevis pin 44 inserted through a hole in the housing and corresponding holes in a mounting bracket 45 fixedly attached to the point 15. However, the housing 42 can be pivotally connected to any convenient support point on the vehicle, such as the transmission, by any suitable fastening means. The end of the front housing 41 opposite the rear housing 42 has a face plate 46 attached thereto by a plurality of suitable fastening means represented by a bolt 47.

The face plate 46 includes a centrally located aperture through which the operator rod 16 extends. The external end of the operator rod 16 is threadably engaged in an axial aperture formed in one end of an adapter rod 48. A lock nut 49 is threaded onto the operator rod 16 and against the adapter rod 48 to prevent relative rotation between the two rods. The opposite end of the adapter rod 48 has a hole formed therein for receiving a clevis pin 51 which connects the adapter rod to the operator link 17.

The internal end of the operator rod 16 is slidably received by a pair of sleeve bushings 52 and 53. The sleeve bushing 52 is press fitted into an aperture in the front housing 41 and, along with a ring seal 54, is retained by the face plate 46. The sleeve bushing 53 is press fitted into an aperture formed in the rear housing 53. The seal 54 prevents dirt and dust from entering the housings and could take the form of a flexible boot connected between the face plate 46 and the external end of the operator rod 16.

The internal end of the operator rod 16 also extends through a centrally located aperture in a gas impervious diaphragm 55 which is retained between opposing faces of the front housing 41 and the rear housing 42 to seal along its circumference. A central portion of the diaphragm 55 is retained between a pair of cup shaped retainers each having a diameter slightly less than the diameter of the bores of the housings 41 and 42 adjacent the diaphragm. A collar 56 having a pair of flanges is retained by a split ring 57 against a shoulder formed on the operator rod 16. The split ring 57 is received in an annular groove in the operator rod 16. A first cup shaped retainer 58 is positioned on the front housing side of the diaphragm 55 and a second cup shaped retainer 59 is positioned on the rear housing side of the diaphragm 55. The retainers 58 and 59 and the diaphragm 55 are assembled on a sleeve with a flange on one end whereupon the flange on the other end is formed to produce the collar 56. The distance between the flanges and the thickness of the retainers 58 and 59 and the diaphragm 55 are such that the retainers and the diaphragm are held in abutting relationship with one another to seal around the edge of the diaphragm aperture to prevent radial movement of the diaphragm away from the operator rod 16. The area between the operator rod 16 and the bore of the collar 56 is sealed by an "O" ring 61 retained in an annular groove in the operator rod. However, the rod 16 can be rotated without rotating the collar 56 to prevent damaging the diaphragm. The cup shaped retainers 58 and 59 form a piston against which the pressurized air can act to move the operator rod 16.

A collar 62 is retained between a first shoulder on the operator rod 16 and one end of a compression spring 63. The other end of the compression spring 63 acts against an end surface of a sleeve 64. The sleeve 64 has formed therein an annular groove for receiving a ball 65 attached to the end of the flexible cable 13. The flexible cable 13 extends through the bore of a flanged bushing 66 which is located in a radially displaced aperture in the end of the front housing 41. The bushing 66 also extends through an aperture in the face plate 46 to threadably engage a nut 67 to attach the bushing to the face plate and seal the aperture therethrough. The ball 65 is retained in the annular groove by a cup shaped retainer 68 which is biased against a shoulder on the sleeve 64 by a compression spring 69. The spring 69 acts against a split ring 71 which is received in an annular groove formed in the sleeve 64. Although the drawings illustrate a means of connecting the flexible cable to the sleeve which includes a ball attached to the end of the cable and retained in an annular groove by a cup shaped retainer, other suitable means of connecting the ball and the sleeve can be utilized.

The operator 14 in FIG. 2 is shown in the clutch fully engaged position. As the clutch pedal of FIG. 1 is depressed, the flexible cable 13 will be drawn through the flanged bushing 66 to move the sleeve toward the face plate 46 while the operator rod 16 remains stationary. The spring 63 will be compressed between the sleeve 64 and the collar 62 as shown in FIG. 3. No matter what the positon of the operator rod 16 and the sleeve 64 relative to the face plate 46, the clutch pedal will be working against the force of the return spring 12. Relative movement of the sleeve 64 toward the face plate 46 with respect to the operator rod 16 is limited by a second shoulder formed on the operator rod spaced from the first shoulder by a distance slightly greater than the fully compressed length of spring 63. If the air pressure source has failed, the sleeve and rod will move in unison to manually operate the clutch.

The operator rod 16 and the sleeve 64 also form a valve for controlling the application of pressurized air to the operator 14 and the venting thereof. The operator rod 16 includes an axial fluid passage having the external end blocked by a plug 72. An air inlet boss 73 formed on the operator rod 16 has a fluid inlet passage which connects with the axial fluid passage. A fitting 74 on the end of the flexible hose 25 threadably engages the inlet boss 73 to supply pressurized air to the axial fluid passage. The axial fluid passage is also blocked by a ball 75 pressed therein at a position between the inlet boss 73 and the end of the operator rod which slidably engages the sleeve bearing 53. The ball 75 divides the axial fluid passage for diverting fluid through the valve elements as discussed below.

One or more first radially extending fluid passages, formed adjacent the ball 75 on the inlet boss side, connect the axial fluid passage with a first annular groove formed in the operator rod 16. One or more second radially extending fluid passages, formed adjacent the ball 75 on the diaphragm side, connect the axial fluid passage with a second relatively wide annular groove formed in the operator rod 16. One or more third radially extending fluid passages, formed approximately equidistant from the ball 75 and the diaphragm 55, connect the axial fluid passage with a third annular groove formed in the operator rod 16. One or more fourth radially extending fluid passages, formed on the side of the diaphragm 55 opposite the other radial fluid passages, connect the axial fluid passage with a first cavity formed by the diaphragm 55 and the rear housing 42. Four seals 76 are formed in the operator rod 16 alternately with and adjacent to the first, second and third radially extending fluid passages. Each seal 76 includes an "O" ring retained in an annular groove with a sealing ring formed of polytetrafluoroethylene or a similar material to prevent leakage between the operator rod 16 and the sleeve 64.

The sleeve 64 also includes fluid passages which cooperate with the corresponding fluid passages in the operator rod 16 to connect the source of pressurized air to the first cavity to vent the first cavity. One or more first radially extending fluid passages, formed adjacent the retainer 68, connect the bore of the sleeve 64 with one or more axial fluid passages formed in the sleeve parallel to the bore and radially spaced therefrom. One or more second radially extending fluid passages, formed between the first passages and the split ring 71, connect the bore of the sleeve 64 with the axial fluid passages. One or more third radially extending fluid passages formed on the diaphragm side of the split ring 71, connect the bore with a second cavity formed by the diaphragm 55, the piston and the front housing 41. The front housing 41 includes a vent plug 77 which permits the second cavity to vent to the atmosphere.

As shown in FIG. 2, in the clutch fully engaged position the second and third radially extending fluid passages of the operator rod 16 and the sleeve 64 respectively are in fluid communication. The first cavity is in fluid communication with the second cavity through the fourth radially extending fluid passages, the axial fluid passage in the operator rod 16 and the third radially extending fluid passages of the operator rod and the sleeve. Since both cavities are at the same air pressure, there will be no force exerted on the operator rod 16 and the clutch will remain in the fully engaged position.

As shown in FIG. 3, as the clutch pedal is initially depressed, the flexible cable moves the sleeve 64 toward the face plate 46 as the operator rod 16 is maintained in position. The forward movement of the sleeve 46 relative to the operator rod 16 will first remove the third radially extending fluid passages from registry and then will place the first radially extending fluid passages into registry as the second radially extending fluid passages remain in registry. Now the source of air under pressure is connected to the first cavity through the axial fluid passage of the operator arm 16, the first radially extending fluid passages, the axial fluid passages in the sleeve 64, the second radially extending fluid passages, the axial fluid passage in the operator rod and the fourth radially extending fluid passages.

The pressurized air will exert a force on the diaphragm 55 and the piston formed from the retainer 58 and the retainer 59 which will tend to force the operator rod 16 through the face plate 46 toward the disengaged position of the clutch. If continued pressure is applied to further depress the clutch pedal, the sleeve 64 will move in unison with the operator rod 16 to the clutch fully disengaged position shown in FIG. 4. If the clutch pedal is held at a partially depressed position, the operator rod 16 will continue to move relative to the sleeve to move the first radially extending fluid passages out of registry and disconnect the source of fluid under pressure from the first cavity. Now the operator force and the clutch pressure spring force are equal and the clutch is held in partial disengagement.

As the clutch pedal is raised, the cable 13 will force the sleeve 64 toward the diaphragm 55 to close the air pressure path and connect the vent path. The first cavity will now vent through the path to reduce the air pressure and the force applied by the operator 14. The clutch pressure springs will force the operator rod back into the operator 14. The operator rod 16 will follow the movement of the clutch pedal and the sleeve to return to the clutch fully engaged position shown in FIG. 2 where it is ready for the next clutch pedal operation.

If the operator 14 should fail, due to, for example, the breakage of the cable 13 or a decrease in the air pressure, the clutch pressure springs will force the operator rod into the housing until the second shoulder on the operator rod 16 contacts the sleeve 64. Then the operator rod 16 and the sleeve 64 will be forced to the fully retracted position of the operator 14 such that in the failure mode the vehicle clutch is engaged. If the failure is not due to the breakage of the cable 13, the operator 14 can be actuated manually. Pressure applied to the clutch pedal 11 will be transmitted through the cable 13 to draw the sleeve 64 against the second shoulder on the operator rod 16 and then draw both the operator rod and the sleeve toward the face plate 46 to operate the clutch linkage to disengage the clutch. The clutch pressure springs and clutch pedal return spring will return the operator 14 to the fully retracted position as the pressure is removed from the clutch pedal.

In summary, the air actuated operator 14 includes an operator rod 16 and a sleeve 64 which cooperate as a valve to alternately connect a source of air under pressure and a venting path to a pressure responsive means internal of the operator. The sleeve is connected to the vehicle clutch pedal which may be depressed to move the sleeve relative to the operator arm. A compression spring positioned between the sleeve and a shoulder formed on the operator arm provides a means to return the sleeve to the vented positon when the clutch pedal is in the up position.

The pressure responsive means includes a diaphragm or sealing rings between the operator housing and the operator rod to divide the interior of the operator housing into two cavities. The sleeve and operator arm each have three pluralities of radially extending fluid passages. As the clutch pedal is depressed, the sleeve will be moved relative to the operator arm to place the first and second fluid passages respectively in registry to connect the source of air under pressure to the first cavity to generate a force which moves the operator arm to operate the clutch. As the clutch pedal is released, the sleeve will be moved relative to the operator arm to place the second and third fluid passages respectively in registry to connect the first cavity to the second cavity for venting. In either direction of operation, the rod will follow the movement of the clutch pedal and the sleeve. If the clutch pedal is held at a position between full engagement and full disengagement, the operator rod will move until the force generated by the air pressure equals the clutch load at which point the sleeve and the rod are in the position between applying air pressure and venting. The valve will remain in this position until the clutch pedal is again moved.

There is shown in FIG. 5 a fragmentary section view of an alternate embodiment of the present invention. Those portions of the operator not shown are similar to the corresponding portions shown in FIGS. 2 through 4. A gas impervious diaphragm 55' is retained between opposing faces of a front housing 41' and a rear housing 42' to seal along its circumference. The front and rear housing are connected together by any suitable fastening means such as bolts represented by a bolt 43'. Although it is not shown, a central portion of the diaphragm 55' is attached to a collar similar to the collar 46 and the cup shaped retainers 58 and 59 have been reduced in size or eliminated.

The bores of the housing 41' and 42' have been tapered toward the exterior surfaces in the region of the opposed faces. In the clutch engaged, vented postion of the operator, a relatively large portion of the diaphragm rests against the tapered bore of the rear housing 42' and therefore, the remaining portion presents a reduced piston area. As air pressure is applied through the valve formed by the rod 16 and the sleeve 64, the diaphragm moves away from the tapered surface of the rear housing 42 thereby exposing an increasing area to the air pressure to increase the force generated through the operator rod. As the clutch approaches the fully disengaged position, the diaphragm will contact the tapered surface of the front housing 41' thereby reducing the effective surface area and reducing the force generated through the operator rod. Therefore, the embodiment shown in FIG. 5 will produce a force/displacement curve on which the generated force peaks between the two extremes of travel. It will be appreciated that other configurations of the bores of the housings 41' and 42' will produce force/displacement curves to complement the operating characteristics of various clutch and linkage combinations.

Therefore, in the alternate embodiment, the fluid actuated operator according to the present invention includes a housing, a valve means and a fluid pressure responsive means. The valve means is internal of the housing and has a first means adapted for connection to a clutch pedal linkage and a second means with a first portion extending through the wall of the housing adapted for connection to a clutch operating linkage. The valve means is connected to a source of fluid under pressure.

The fluid pressure responsive means is internal of the housing and attached to a second portion of the valve second means and the housing to form a first cavity in fluid communication with the valve means. As the clutch pedal is actuated in a first direction, the valve first means is moved to connect the source of fluid under pressure to the first cavity through the valve means. The fluid pressure responsive means presents and effective surface area to the fluid under pressure which varies according to the position of the valve second means relative to the housing. The fluid pressure responsive means can be a flexible bellows which cooperates with a contoured area in the bore of the housing to generate a nonlinear force/displacement curve. The valve first means may be a sleeve and the valve second means may be an operator rod as previously described.

In accordance with the provisions of the patent statutes, the principle and mode of operation of the invention have been explained and illustrated in a preferred embodiment. However, it must be understood that within the spirit and scope of the appended claims, the invention may be practiced otherwise than as specifically illustrated and described.

What is claimed is:

1. In a clutch operating apparatus for a vehicle having a clutch connected to a clutch operating linkage, a clutch pedal connected to a clutch pedal linkage, a source of pressure fluid, and a fluid actuated operator connected thereto, wherein the fluid actuated operator comprises:

a housing;

a sleeve internal of said housing and connected to the clutch pedal linkage, said sleeve having an axial bore and a first fluid passage means with both ends axially spaced apart and in fluid communication with said axial bore;

an operator rod having one end connected to the clutch operating linkage and the other end extending through the wall of said housing and the axial bore of said sleeve, said operator rod having a first fluid passage having one end communicating with the source of pressure fluid and the other end in communication with the exterior of said operator rod internal of said housing, and a second fluid passage having one end communicating with the exterior of said operator rod and axially spaced from the other end of said first fluid passage of said operator rod internal of said housing and the other end in communication with the exterior of said operator rod internal of said housing; and means responsive to pressure fluid for moving said operator rod in an axial direction, said pressure fluid responsive means internal of said housing and attached to said operator rod and to said housing to form a first cavity in fluid communication with the other end of said second fluid passage of said operator rod whereby actuation of the clutch pedal in a first direction moves said sleeve to position each end of the first fluid passage of said sleeve in registry with a corresponding one of the axially spaced ends of said first and second fluid passages in fluid communications with the exterior of said operator rod to connect the source of pressure fluid to said first cavity.

2. The invention according to claim 1 wherein said housing and said means responsive to pressure fluid from a second cavity, said sleeve includes a second fluid passage having one end in fluid communication with said second cavity and the other end in fluid communication with the axial bore of said sleeve, and said operator rod includes a third fluid passage having one end in fluid communication with said second fluid passage of said operator rod and the other end in fluid communication with the exterior of said operator rod internal of said housing whereby actuation of the clutch pedal in a second direction moves said sleeve to position said other ends of the second fluid passage of said sleeve and the third fluid passage of said operator rod into registry to connect said first cavity to said second cavity.

3. The invention according to claim 2 wherein said second cavity is vented to the atmosphere.

4. The invention according to claim 2 wherein said operator rod includes an annular groove formed therein and a plurality of said third fluid passages connected to said annular groove and wherein said sleeve includes a plurality of said second fluid passages for registry with said annular groove.

5. The invention according to claim 1 wherein the first fluid passage of said operator rod terminates at said other end in a plurality of radially extending fluid passages in fluid communication with the exterior of said operator rod.

6. The invention according to claim 5 wherein said plurality of radially extending fluid passages are connected to an annular groove formed in said operator rod.

7. The invention according to claim 6 wherein said sleeve includes a plurality of said first fluid passages each having one end positioned for registry with said annular groove.

8. The invention according to claim 1 wherein said operator rod second fluid passage terminates at said one end in a plurality of radially extending fluid passages in fluid communication with the exterior of said operator rod.

9. The invention according to claim 8 wherein said plurality of radially extending fluid passages are connected to an annular groove formed in said operator rod.

* * * * *

UNITED STATES PATENT AND TRADEMARK OFFICE
CERTIFICATE OF CORRECTION

PATENT NO. : 4,114,743

DATED : September 19, 1978

INVENTOR(S) : William H. Sink and Russel L. Mitchener

It is certified that error appears in the above-identified patent and that said Letters Patent are hereby corrected as shown below:

Column 7, line 4, "movement" should be -- moment --.

Claim 2, line 3, "from" should be -- form --.

Signed and Sealed this

Twenty-eighth Day of November 1978

[SEAL]

Attest:

RUTH C. MASON
*Attesting Officer*

DONALD W. BANNER
*Commissioner of Patents and Trademarks*